United States Patent
Tomura et al.

[11] Patent Number: 5,905,333
[45] Date of Patent: May 18, 1999

[54] LOW PRESSURE MERCURY VAPOR ELECTRIC DISCHARGE LAMP AND METHOD OF MANUFACTURING THE LAMP

[75] Inventors: Chiharu Tomura; Natsuko Inada; Masahiko Yamakawa, all of Yokohama, Japan

[73] Assignee: Kabushiki Kaisha Toshiba, Kawasaki, Japan

[21] Appl. No.: 08/669,531

[22] PCT Filed: Mar. 26, 1996

[86] PCT No.: PCT/JP96/00784

§ 371 Date: Jul. 12, 1996

§ 102(e) Date: Jul. 12, 1996

[87] PCT Pub. No.: WO97/12384

PCT Pub. Date: Apr. 3, 1997

[30] Foreign Application Priority Data

Sep. 27, 1995 [JP] Japan .................................. 7-249669

[51] Int. Cl.⁶ .................. H01J 61/46; H01J 9/22
[52] U.S. Cl. .................... 313/485; 313/489; 313/572
[58] Field of Search .................... 313/485, 489, 313/571, 572, 577; 427/64, 67, 157

[56] References Cited

U.S. PATENT DOCUMENTS

| | | | |
|---|---|---|---|
| 4,451,757 | 5/1984 | Lagos | 427/67 |
| 4,827,187 | 5/1989 | Verlijsdonk | 313/487 X |
| 5,268,614 | 12/1993 | Labib et al. | 313/489 X |
| 5,514,932 | 5/1996 | Willibrordus et al. | 313/489 X |
| 5,624,602 | 4/1997 | Lenox et al. | 313/489 X |

FOREIGN PATENT DOCUMENTS 58-126658  7/1983  Japan .

OTHER PUBLICATIONS

English Language Derwent Abstract of Japanese Patent Application No. 04 322 457, Oct. 19, 1992.

*Primary Examiner*—Ashok Patel
*Attorney, Agent, or Firm*—Finnegan, Henderson, Farabow, Garrett & Dunner, L.L.P.

[57] ABSTRACT

This invention provides a low pressure mercury vapor electric discharge lamp composed of a glass bulb whose inner surface is coated with a fluorescent material film, the fluorescent material film contains a fluorescent material, pyrophosphate having an average grain size of 3.0 $\mu$m or less and preferably 1.0 $\mu$m or less, at least one of alkaline earth metal salt and nitrate, and a boric acid compound. According to the above arrangement, there can be obtained a low pressure mercury vapor electric discharge lamp having an improved fluorescent material film adhering strength, an improved total beam of light, a high beam of light maintaining ratio and a less amount of blacking.

14 Claims, 2 Drawing Sheets

LOW PRESSURE MERCURY VAPOR ELECTRIC DISCHARGE LAMP AND METHOD OF MANUFACTURING THE LAMP

BACKGROUND OF THE INVENTION

1. Field of the Invention

The present invention relates to a low pressure mercury vapor electric discharge lamp and a method of manufacturing the lamp, and more specifically, to a low pressure mercury vapor electric discharge lamp by which the adhering strength of a fluorescent film and a total beam of light are improved as well as a beam of light maintaining ratio is increased and a blacking is reduced.

2. Description of the Related Art

There are widely used low pressure mercury vapor electric discharge lamps such as fluorescent lamps and the like having a fluorescent material film formed on the inner surface of a glass tube. FIG. 2 shows the general structure of a mercury vapor electric discharge lamp 1. In FIG. 2, the reference numeral 2 denotes a glass tube and numeral 3 denotes a fluorescent material film (phosphor layer) coated on the inner wall of the glass tube 2. In general, the low pressure mercury vapor electric discharge lamp is made by the following method. That is, after a slurry of fluorescent coating composition prepared by mixing a fluorescent material with a predetermined amount of a binder and a coupling agent is coated onto the inner surface of the glass tube, a fluorescent material film is formed on the inner surface of the glass tube integrally therewith through a drying/baking process.

Conventionally, a solution prepared by dissolving nitrocellulose or ethyl cellulose in organic solvent such as butyl acetate, xylene or the like is ordinarily used as the binder and a fluorescent material coating composition made by suspending the fluorescent material and the coupling agent in the organic solvent is coated onto the inner surface of a glass tube (bulb) and dried and baked to form a fluorescent material film. As the coupling agent used to the organic solvent composition, both Ba—Ca boric acid compound is ordinarily used together with calcium pyrophosphate.

When the above organic solvent composition is used, however, a problem arises in that the organic solvent composition is vaporized when it is handled and adversely affects a human body and the safety in job and the quality of products are lowered by it. In particular, when the glass tube (bulb) to which the above composition is coated is baked, harmful gases such as CO, $CO_2$, $No_x$, etc. are liable to be generated and may cause environmental pollution such as air pollution and the like.

Further, an electric discharge lamp having a filament in a vacuum glass tube has a problem that a gas is liable to be discharged in the tube by an increase of a temperature in the tube and thus there is a tendency that lamp characteristics are lowered. In particular, there is a problem that a total beam of light is remarkably lowered when the lamp is lit.

Taking the above problems into consideration, the organic solvent composition tends to be gradually not used, whereas a method of using a water soluble fluorescent material coating composition prepared by dissolving a water soluble binder to water is employed. That is, this is a method of preparing a water soluble composition by suspending fluorescent material and a coupling agent to a solution made by dissolving the water soluble binder to water and coating the composition to the inner surface of a glass tube and drying and baking it to thereby form a fluorescent material film.

It is proposed to use at least one of $Sr(NO_3)_2$ and $Ba(NO_3)_2$ and at least one of boric acid, boric acid anhydride and calcium pyrophosphate as the coupling agent to be used when the water soluble composition is formed as disclosed in, for example, Japanese Patent Application Laid-Open No. 58-126658.

However, the coupling agent has a problem that lamp characteristics are liable to be lowered because the coupling agent has not sufficient chemical stability with respect to a fluorescent material. Further, since the coupling agent is composed of a non-light-emitting material of fine particles, if it is added in a large amount, the light emitting characteristics of a fluorescent material film is lowered, thus the light emitting output of a fluorescent lamp and the like and the beam of light maintaining ratio thereof when the lamp is lit are lowered as well as blacking is caused at an earlier time.

On the other hand, when an additive amount of the coupling agent is too small, there is a drawback that the fluorescent material film does not strongly adhere to a glass tube and what is obtained is only a fluorescent material film which is exfoliated or peeled-off very easily. In particular, the fluorescent material film is liable to be exfoliated or fallen away in a process for bending a glass tube to manufacture a circular electric discharge lamp or a high load type electric discharge lamp using the coupling agent or in a process for sealing a nitrogen gas or a rare gas into the glass tube, thus the value of the thus made electric discharge lamp as a commodity is often lost.

In general, although the fluorescent material coating composition using the organic solvent can form a fluorescent material film on the inner surface of a glass tube at a coupling strength higher than that of the composition using a water soluble binder, it is confirmed that the fluorescent material film is also liable to be exfoliated or fallen away in the process for bending the glass tube likewise. Further, when the water soluble coating composition is used, there is a tendency that exfoliation is caused more often in manufacturing processes as compared with the organic coating composition.

As disclosed in the above published application, it is contemplated to increase the concentration of the coupling agent such as $Sr(NO_3)_2$ and $Ba(NO_3)_2$ or boric acid, boric acid anhydride, calcium pyrophosphate and the like as a countermeasure for preventing the exfoliation and falling away of the fluorescent material film. However, an increase of the concentration of the coupling agent causes such adverse effects as a decrease of the beam of light of a lamp and a decrease of the beam of light maintaining ratio thereof, thus it is difficult to obtain an electric discharge lamp excellent in both the adhering strength (coupling force) of the fluorescent material film and lamp characteristics in any case.

An object of the present invention made to solve the above problems is to provide a low pressure mercury vapor electric discharge lamp by which the adhering strength of a fluorescent material film and a total beam of light can be improved as well as a beam of light maintaining ratio is increased and a less amount of blacking is caused and a method of manufacturing the low pressure mercury vapor electric discharge lamp.

SUMMARY OF THE INVENTION

To achieve the above object, the inventors prepared fluorescent material coating compositions by using various types of fluorescent materials, coupling agents and binders as well as using coupling agents whose grain size and grain size distribution were variously changed, formed fluorescent material films by coating the respective compositions to the inner surfaces of glass tubes and then drying and baking them and examined by comparison the effects of the factors such as the types of the fluorescent materials and coupling agents, the grain size and grain size distribution of the binders on a fluorescent material film adhering strength and lamp characteristics.

As a result, the inventors have found that when an electric discharge lamp is made by forming a fluorescent material film by coating a fluorescent material coating composition (slurry), which contains pyrophosphate having a 50% grain size distribution of 10.0 μm or less or pyrophosphate having an average grain size equal to or less than that of a fluorescent material, a water soluble binder, at least one of alkaline earth metal salt and nitrate, and a boric acid compound, to a glass tube and drying it, an electric discharge lamp having a high fluorescent material film adhering strength (coupling force) and excellent in lamp characteristics such as a total beam of light and the like can be obtained.

Further, it is found that an electric discharge lamp of high quality can be safely made without causing the problem of the adverse effect to a human body, air pollution, safety in job and the like because no organic solvent such as butyl acetate, xylene and the like is used but a water soluble fluorescent material coating composition is used.

Further, it is found that since the fluorescent material film has the strong adhering strength, no fluorescent material film is exfoliated or fallen away in the processes for manufacturing a circular type electric discharge lamp and a high load type electric discharge lamp including a process for bending a glass tube, thus an electric discharge lamp of high quality can be obtained.

The present invention has been achieved based on the above knowledge. That is, a low pressure mercury vapor electric discharge lamp according to the present invention which has a fluorescent material film formed onto the inner surface of a glass tube is characterized in that the fluorescent material film contains a fluorescent material, pyrophosphate having an average grain size of 3.0 μm or less and preferably 1.0 μm or less, at least one of alkaline earth metal salt and nitrate, and a boric acid compound.

When the average grain size of the pyrophosphate regulated by a certain absolute value as described above is expressed as a value compared with that of the particles of the fluorescent material in place of the absolute value, the average grain size of the pyrophosphate can be expresses as one half or less that of the average grain size of the fluorescent material and more preferably as one fifth or less that of the average grain size thereof.

Further, pyrophosphate is preferably composed of at least one selected from $Ba_2P_2O_7$, $Al_4(P_2O_7)_3$, $Sr_2P_2O_7$, $Ca_2P_2O_7$, $Mg_2P_2O_7$, $Sn_2P_2O_7$, and $Zn_2P_2O_7$.

The electric discharge lamp of the present invention is suitably applicable to a low pressure mercury vapor electric discharge lamp whose glass tube is formed to a circular shape or a low load shape. It is needless to say, however, that it is not limited thereto and also applicable to a low pressure mercury vapor electric discharge lamp having a glass tube formed to a straight shape.

A method of manufacturing the low pressure mercury vapor electric discharge lamp according to the present invention comprises the step of forming a fluorescent material film by coating a fluorescent material coating composition to the inner surface of a glass tube and heating the fluorescent material coating composition which contains a fluorescent material, a water soluble binder, pyrophosphate having a 50% grain size distribution of 10.0 μm or less and preferably 5.0 μm or less, at least one of alkaline earth metal salt and nitrate, and a boric acid compound.

In the above manufacturing method, the pyrophosphate of the present invention whose 50% grain size distribution is regulated to 10.0 μm or less and preferably 5.0 μm or less may be regulated as pyrophosphate having a grain size equal to or less than that of the fluorescent material and preferably one half or less that of the fluorescent material when compared with the average grain size of the fluorescent material.

The pyrophosphate whose average grain size is equal to or less than that of the fluorescent material and preferably one half or less that of the fluorescent material or the pyrophosphate whose 50% grain size distribution is 10.0 μm or less and preferably 5.0 μm or less is preferably prepared by beads milling using non-alkaline glass beads.

The fluorescent material coating composition used in the present invention is prepared by suspending the fluorescent material and the coupling agent in a water soluble binder. Alkaline earth metal salt and nitrate as the coupling agent increase the fluorescent material film adhering strength as well as are effective to improve the lamp characteristics and added in a ratio of 0.05–3 wt % to the fluorescent material. In particular, a ratio of 0.1–3 wt % is preferable in the case of that the glass tube is formed to the circular shape or the high load shape.

Although it is confirmed that nitrate of Mg, Ca, Sr, Ba is preferable as the above alkaline earth metal salt and effective to improve the lamp characteristics, it is found that halogen compound salt is unsuitable. Further, a nitric acid compound containing a metal element such as Al, Gd, Y, La, Ce, etc. is preferable as nitrate.

Note, when a composition in which alkaline earth metal salt or nitrate is prepared as an independent coupling agent is used, the fluorescent material film is liable to be exfoliated or fallen away in a lamp manufacturing process. To cope with this problem, the present invention obtains a remarkable effect for the effective prevention of exfoliation of the fluorescent material film by using a boric acid compound together with pyrophosphate.

In particular, the boric acid compound has a function for effectively and eminently preventing the exfoliation of the fluorescent material film, thus it is a component indispensable to the water soluble fluorescent material coating composition. It is added to the fluorescent material in a ratio of 0.005 wt % or more. However, when a compound such as boric acid or the like is excessively added to the fluorescent material in a ratio greater than 3 wt %, the following drawback is caused to the lamp characteristics. That is, there is caused such a drawback that a glass tube is formed to an uneven wall thickness in a process for bending the glass tube during the manufacture of a lamp, at this time, the boric acid compound which is melted and made to a noncrystalline state and the fluorescent material coated to the glass are liable to sink into the thin wall thickness portion of the glass tube with a result that the bulb strength of the lamp is disadvantageously lowered.

On the other hand, when the boric acid compound has an increased concentration in the preparation of the water soluble fluorescent material coating composition in a slurry state, there is caused a drawback that the stability of the coating composition is injured. Further, there is obtained a result that blacking is caused earlier and a total beam of light maintaining ratio is liable to be lowered. Therefore, an additive amount of the boric acid compound is approximately within a range of 0.005–3% to the fluorescent material and more preferably within a range of 0.05–2.0 wt % in practical use, although it depends on an additive amount of pyrophosphate to be described later.

Since pyrophosphate restricts an additive amount of the above boric acid compound as well as exhibits a function for increasing the fluorescent material film adhering strength in cooperation with alkaline earth metal salt, nitrate and the boric acid compound, it is added in a range of 0.1–5 wt % to the fluorescent material.

Note, there is a known example as prior art which uses pyrophosphate as the coupling agent. In the prior art, calcium pyrophosphate is used as a typical example of pyrophosphate. The calcium pyrophosphate is made as powder in such a manner that the sintered body of the calcium pyrophosphate is crushed in a crusher, a mortar and the like and thereafter caused to pass through a sieve of 100 mesh or the like. However, the calcium pyrophosphate powder is composed of roughly aggregated powder and the 50% grain size distribution thereof has a very rough or coarse value of 30–40 $\mu$m.

The inventors have been assured of that the size of the pyrophosphate and its grain size distribution greatly affect the fluorescent material film adhering strength. That is, it is found that when pyrophosphate has an average grain size exceeding that of the fluorescent material and when rough or coarse pyrophosphate whose 50% grain size distribution exceeds 10 $\mu$m is used, the fluorescent material adhering strength cannot be sufficiently obtained.

Thus, a remarkable feature of the present invention resides in that the rough particles of pyrophosphate are made to uniform particles or single particle by being crushed by beads milling or pyrophosphate having an average grain size equal to or less than that of the fluorescent material film or fine pyrophosphate whose 50% grain size distribution is 10 $\mu$m or less is used as fine aggregated particles or single particle.

The beads milling is an operation for mixing and crushing roughly aggregated particles together with non-alkaline glass beads having a diameter of about 1.6–2.0 mm as a crushing medium and a dispersing agent for 30–40 hours. Note, a dispersing effect of crushed powder is made more remarkable by the use of a surfactant as a dispersing agent and a pH adjuster in the beads milling.

A grain size distribution of calcium pyrophosphate subjected to the beads milling for 30–40 hours and dispersed in water was measured by a grain size distribution measuring instrument (Microtrack II, Model: SRA made by Nikkiso K.K.) and a result shown in FIG. 1 was obtained. As shown in FIG. 1, the calcium pyrophosphate used in the present invention has a fine average grain size and the 50% grain size distribution thereof is also very small as compared with that of a conventional example.

A water soluble fluorescent material coating composition was prepared by adding to a weight of a fluorescent material 0.1–5 wt % fine calcium pyrophosphate having a grain size distribution shown in FIG. 1, 0.05–3 wt % alkaline earth metal salt such as $Ca(NO_3)_2$ or the like and nitrate, and 0.005–3 wt % boric acid compound such as boric acid anhydride or the like and coated to the inner surface of a glass tube and dried and baked to form a fluorescent material film having a predetermined thickness for the mass-production of FCL30W circular type fluorescent lamps. As a result, there could be obtained mercury vapor electric discharge lamps having a fluorescent material film which was neither exfoliated nor fallen away and excellent in lamp characteristics at a high production yield.

On the other hand, FCL30W type fluorescent lamps were made using a coating composition prepared by adding to a fluorescent material 0.1–3 wt % nitrate compound containing a metal element such as Al, Gd, Y, La, Ce, etc. and further adding thereto 0.005–3 wt % borate without adding pyrophosphate. In this case, however, a fluorescent material film was exfoliated a little and a 2000 hours beam of light maintaining ratio regulated by JIS C 7601 was deteriorated. From this fact, it is found that a coating composition without pyrophosphate cannot not obtain a low pressure mercury vapor electric discharge lamp excellent in lamp characteristics without the exfoliation of a fluorescent material film.

DESCRIPTION OF PREFERRED EMBODIMENT

Figure 1:
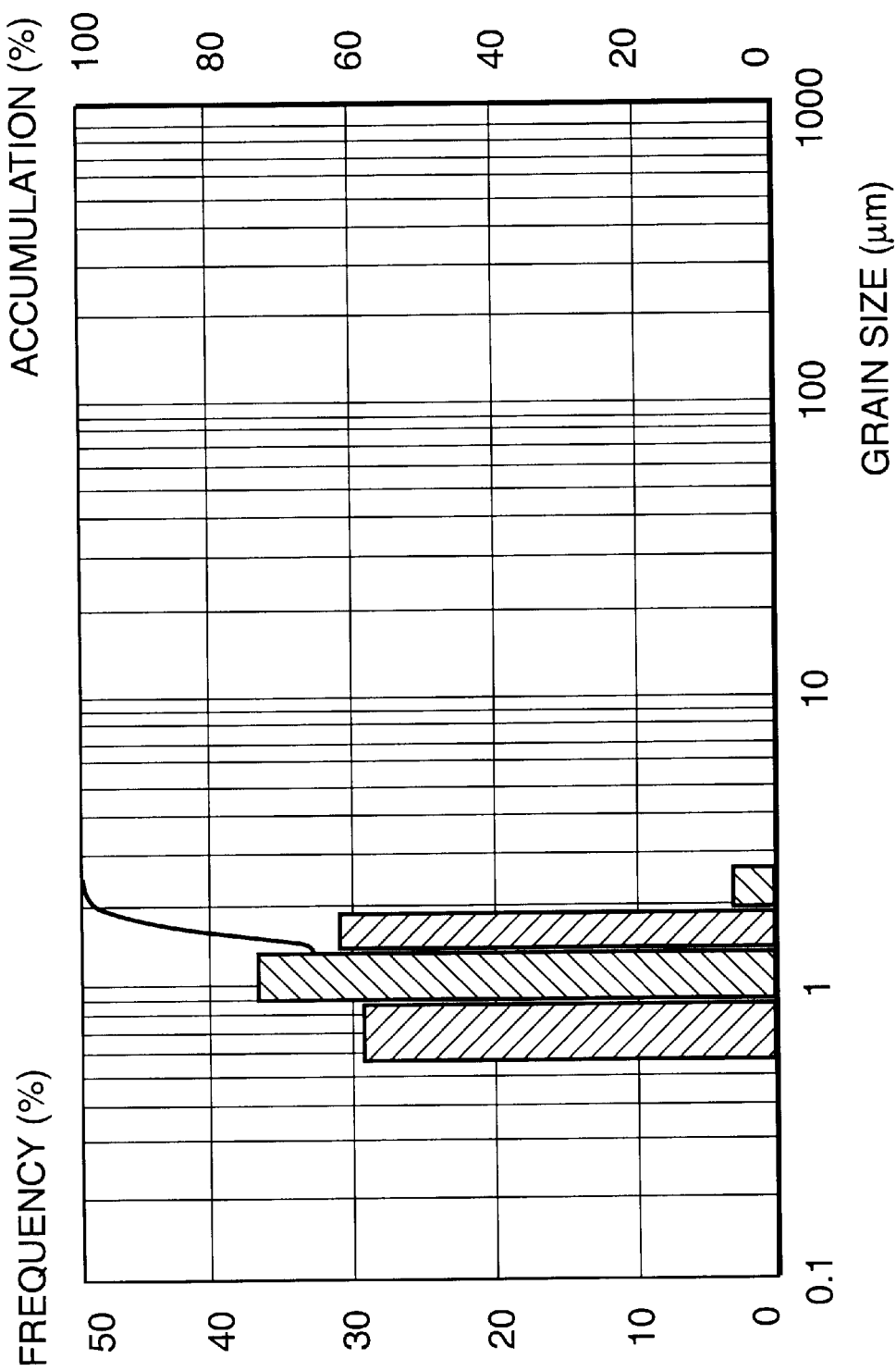
FIG. 1 is a graph showing an example of the particle size distribution of pyrophosphate used in a method of the present invention.
Figure 2:
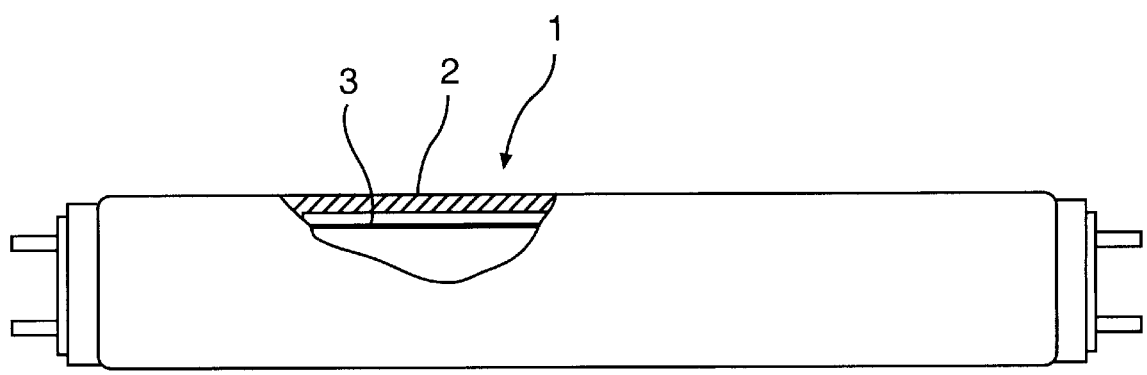
FIG. 2 shows a structure of a low pressure mercury vapor electric discharge lamp.

Next, an embodiment of the present invention will be described below based on the following examples in specific detail.

EXAMPLES 1–3

Rough calcium pyrophosphate ($Ca_2P_2O_7$) was subjected to beads milling for 30–40 hours to prepare a solution in which dispersed was calcium pyrophosphate having a 50% grain size distribution of 1.2 $\mu$m.

On the other hand, a water soluble binder composed of a water solution containing 0.6% polyethylene oxide and having a viscosity within a range of 100–160 mPa.S (liquid temperature; 25° C.) was prepared as a water soluble binder.

Next, a three-wavelength daylight color fluorescent material was gradually added in an amount of 200 g into the water soluble binder (320 ml) while it was being stirred by a magnetic stirrer, and after it was stirred for 2 hours, a surfactant was added to improve a dispersion effect and the film forming property of a fluorescent material film. Further, the water soluble binder was added with 1.0 g $Ca(NO_3)_2$ as alkaline earth metal salt and stirred for 2 hours and then added with 0.4 g $B_2O_3$ as boric acid and further stirred for 3 hours. Next, the previously prepared $Ca_2P_2O_7$ dispersed solution having the 50% grain size distribution of 1.2 $\mu$m was added in an amount of 1–3 wt % to the fluorescent material as shown in Table 1 and stirred for 10 hours or longer to prepare fluorescent material coating compositions for Examples 1–3, respectively.

Next, the thus obtained respective compositions were coated on the inner surfaces of glass bulbs and formed to high quality fluorescent material films integrally therewith by scattering a water content using a coating apparatus capable of blowing air heated to about 60–80° C. Thereafter, 30 W circular fluorescent lamps (Model; FCL30EX-N/28) relating to Examples 1–3 were made through usual lamp manufacturing processes.

EXAMPLES 4–6

Rough pyrophosphoric acid strontium ($Sr_2P_2O_7$) was subjected to the beads milling for 30–40 hours to prepare a solution in which dispersed was pyrophosphoric acid strontium having a 50% grain size distribution of 1.2 $\mu$m.

Next, the water soluble binder prepared in Example 1 was also used and a three-wavelength daylight color fluorescent material of 200 g was gradually added into the water soluble binder while it was being stirred by a magnetic stirrer, and after it was stirred for 2 hours, a surfactant was added to improve a dispersion effect and the film forming property of a fluorescent material film. Further, the water soluble binder was added with 1.0 g $Ca(NO_3)_2$ as alkaline earth metal salt and stirred for 2 hours and then added with $H_3BO_3$ as boric acid in an amount of 0.2–6 g and further stirred for 3 hours. Next, the previously prepared $Sr_2P_2O_7$ dispersed solution having the 50% grain size distribution of 1.2 μm was added in an amount of 1.0 wt % to the fluorescent material as shown in Table 1 and stirred for 10 hours or longer to prepare fluorescent material coating compositions for Examples 4–6, respectively.

Next, the thus obtained respective compositions were coated on the inner surfaces of glass bulbs and formed to high quality fluorescent material films integrally therewith by scattering a water content using a coating apparatus capable of blowing air heated to about 60–80° C. Thereafter, 30 W circular fluorescent lamps (Model; FCL30EX-N/28) relating to Examples 4–6 were made through the usual lamp manufacturing processes.

EXAMPLES 7–10

Examples 7–10 show fluorescent lamps using nitrate (Examples 7–9) or a halogen compound (Example 10) as alkaline earth metal salt and these fluorescent lamps were made by the following processes.

That is, a three-wavelength daylight color fluorescent material of 200 g was gradually added into the water soluble binder prepared in Example 1 while it was being stirred, and after it was stirred for 2 hours, a surfactant was added thereto. Next, the water soluble binder containing the fluorescent material was divided for Examples 7–10. Then, 1 g $Ba(NO_3)_2$ was added to the water soluble binder for Example 7, 1.0 g $Sr(NO_3)_2$ was added to that for Example 8, 1 g $Mg(NO_3)_2$ was added to that for Example 9 and $CaCl_2$ was added to that for Example 10 and the thus obtained water soluble binders were stirred for 2 hours and then added with 0.4 g $B_2O_3$ as boric acid, respectively and stirred for 3 hours. Thereafter, fluorescent material coating compositions for Examples 7–10 were prepared by adding the $Ca_2P_2O_7$ dispersed solution used in Example 1 having the 50% grain size distribution of 1.2 μm in an amount of 1 wt % to the fluorescent material and stirring the water soluble binders for 10 hours or longer.

Next, 30 W circular fluorescent lamps (Model; FCL30EX-N/28) relating to Examples 7–10 each having the same dimension as those of Example 1 were made through the same lamp manufacturing processes by coating the respective compositions prepared as described above to the inner surfaces of glass bulbs likewise Example 1.

Comparative Example 1

On the other hand, there was prepared a fluorescent material coating composition similar to that of Example 1 except that no $Ca_2P_2O_7$ as pyrophosphoric acid was added and 30 W circular fluorescent lamps relating to Comparative Example 1 were made by coating the composition to the inner surfaces of glass bulbs and drying and baking it.

Comparative Example 2

30 W circular fluorescent lamps relating to Comparative Example 2 having the same dimension as those of the above examples were made by using a fluorescent material coating composition prepared by adding a boric acid compound as a coupling agent to a conventional organic binder composed of butyl acetate as organic solvent containing nitrocellulose dissolved therein.

A fluorescent material film adhering strength, an initial total beam of light, a beam of light maintaining ratio after 2000 hours of lighting and a resistance to blacking of the fluorescent lamps of Examples 1–10 and Comparative Examples 1–2 made as described above were measured for evaluating characteristics thereof.

The fluorescent material film adhering strength was evaluated by the size of an exfoliated area of the fluorescent material film by the following method. That is, the outside surface of each fluorescent lamp which was 8 cm apart from the mount of the lamp in the peripheral direction thereof was snapped by a piano wire having a diameter of 1 mm and an area of the fluorescent material film exfoliated by the impact force applied by the piano wire was measured.

Further, the resistance to blacking was evaluated by visually observing a degree of blacking after each fluorescent lamp was repeatedly turned on and off by a method according to 2000 Hours Beam of Light Maintaining Test (JIS C 7601). To establish a reference for comparison, the blacked state of Comparative Example 2 using the organic binder was set to a resistance to blacking index 8.0 and a state in which no blacking was caused was set to the resistance to blacking index 10. Thus, the blacked states of respective examples and comparative examples were compared with each other and expressed by index numbers. Table 1 shows a result of the respective measurements.

TABLE 1

| SPECIMEN No. | BINDER | PYROPHOSPHATE TYPE | CONTENT (%) | BORIC ACID COMPOUND TYPE | CONTENT (%) | ALKALINE EARTH METAL SALT TYPE | CONTENT (%) |
|---|---|---|---|---|---|---|---|
| EXAMPLE 1 | WATER SOLUBLE | $Ca_2P_2O_7$ | 1.0 | $B_2O_3$ | 0.2 | $Ca(NO_3)_2$ | 0.5 |
| EXAMPLE 2 | WATER SOLUBLE | $Ca_2P_2O_7$ | 2.0 | $B_2O_3$ | 0.2 | $Ca(NO_3)_2$ | 0.5 |
| EXAMPLE 3 | WATER SOLUBLE | $Ca_2P_2O_7$ | 3.0 | $B_2O_3$ | 0.2 | $Ca(NO_3)_2$ | 0.5 |
| EXAMPLE 4 | WATER SOLUBLE | $Sr_2P_2O_7$ | 0.5 | $H_3BO_3$ | 0.2 | $Ca(NO_3)_2$ | 0.5 |
| EXAMPLE 5 | WATER SOLUBLE | $Sr_2P_2O_7$ | 0.5 | $H_3BO_3$ | 1.5 | $Ca(NO_3)_2$ | 0.5 |
| EXAMPLE 6 | WATER SOLUBLE | $Sr_2P_2O_7$ | 0.5 | $H_3BO_3$ | 6.0 | $Ca(NO_3)_2$ | 0.5 |
| EXAMPLE 7 | WATER SOLUBLE | $Ca_2P_2O_7$ | 1.0 | $B_2O_3$ | 0.2 | $Ba(NO_3)_2$ | 0.5 |
| EXAMPLE 8 | WATER SOLUBLE | $Ca_2P_2O_7$ | 1.0 | $B_2O_3$ | 0.2 | $Sr(NO_3)_2$ | 0.5 |
| EXAMPLE 9 | WATER SOLUBLE | $Ca_2P_2O_7$ | 1.0 | $B_2O_3$ | 0.2 | $Mg(NO_3)_2$ | 0.5 |
| EXAMPLE 10 | WATER SOLUBLE | $Ca_2P_2O_7$ | 1.0 | $B_2O_3$ | 0.2 | $CaCl_2$ | 0.5 |
| COMPARATIVE EXAMPLE 1 | WATER SOLUBLE | — | — | $B_2O_3$ | 0.2 | $Ca(NO_3)_2$ | 0.5 |
| COMPARATIVE EXAMPLE 2 | ORGANIC | BUTYL ACETATE + NITROCELLULOSE + BORIC ACID COMPOUND | | | | | |

TABLE 1-continued

| SPECIMEN No. | EXFOLIATED AREA OF FLUORESCENT MATERIAL FILM (mm$^2$) | INITIAL TOTAL BEAM OF LIGHT (lm) | AFTER 2000 HOURS OF LIGHTING | |
|---|---|---|---|---|
| | | | BEAM OF LIGHT MAINTAINING RATIO (%) | BLACKING INDEX |
| EXAMPLE 1 | 0.8 | 2207 | 94.3 | 8.5 |
| EXAMPLE 2 | 0.0 | 2209 | 94.5 | 9.0 |
| EXAMPLE 3 | 0.0 | 2194 | 93.9 | 9.0 |
| EXAMPLE 4 | 0.0 | 2189 | 93.6 | 8.5 |
| EXAMPLE 5 | 0.0 | 2185 | 91.8 | 8.0 |
| EXAMPLE 6 | 0.0 | 2157 | 90.1 | 7.0 |
| EXAMPLE 7 | 0.0 | 2219 | 94.7 | 9.0 |
| EXAMPLE 8 | 0.0 | 2201 | 93.3 | 8.5 |
| EXAMPLE 9 | 0.0 | 2220 | 93.1 | 8.5 |
| EXAMPLE 10 | 0.0 | 2147 | 90.6 | 7.0 |
| COMPARATIVE EXAMPLE 1 | 7.1 | 2215 | 93.5 | 8.0 |
| COMPARATIVE EXAMPLE 2 | 12.6 | 2180 | 91.2 | 8.0 |

As apparent from the result shown in Table 1, the fluorescent lamps of Examples 1–10 made by using the water soluble fluorescent material coating compositions each containing a predetermined amount of pyrophosphate, boric acid compound and alkaline earth metal salt had a very small amount of the fluorescent material film exfoliated and could obtain an excellent adhering strength as compared with that of Comparative Example 2 using the conventional organic binder. Further, Examples 1–10 could obtain an excellent result in lamp characteristics such as the initial total beam of light, the beam of light maintaining ratio after 2000 hours of lighting, the resistance to blacking and the like as compared with the conventional products.

Examples 4–6 show fluorescent lamps in which fine pyrophosphoric acid strontium subjected to the beads milling was contained in an amount of 0.5 wt % to a fluorescent material and the content of borate was increased from 0.2 wt % to 6 wt %. In this case, even if $Sr_2P_2O_7$ had an excellently distributed grain size, when an additive amount of boric acid was increased to 6.0 wt %, the beam of light maintaining ratio after 2000 hours of lighting and the blacked state had a tendency of deterioration although they were excellent in adhering strength.

It was confirmed that this tendency was not limited to the case that pyrophosphate was composed of $Sr_2P_2O_7$ but the lamp characteristics also exhibited the same tendency when $Ba_2P_2O_7$, $Al_4(P_2O_7)_3$, $Ca_2P_2O_7$, $Mg_2P_2O_7$, $Sn_2P_2O_7$, and $Zn_2P_2O_7$ were used individually or as compounds made by combining them.

Example 10 shows fluorescent lamps using chloride ($CaCl_2$) as alkaline earth metal salt. However, it was observed that the initial total beam of light of the lamps was greatly lowered as well as the lamps had a tendency that a beam of light maintaining ratio after 2000 hours of lighting and a blacked state were deteriorated. This tendency was admitted not only in a case that $CaCl_2$ was used but also in a case that other halogen element compound was used.

EXAMPLES 11–12

Comparative Example 3

Next, how the adhering strength of fluorescent material films and lamp characteristics are affected by the value of a 50% grain size distribution of pyrophosphate will be described based on Examples 11–12 and Comparative Example 3.

There were prepared three types of $Ca_2P_2O_7$ dispersed solutions having a 50% grain size distribution of 1.2 μm (for Example 11), 6.1 μm (for Example 12) and 15.9 μm (for Comparative Example 3), respectively.

On the other hand, a three-wavelength daylight color fluorescent material of 200 g was gradually added into the water soluble binder (320 ml) prepared in Example 1 while it was being stirred and after it was stirred for 2 hours, a surfactant was added. Further, the water soluble binder was added with 1 g $Ba(NO_3)_2$ and stirred for 2 hours and then further added with 0.4 g $B_2O_3$ and stirred for 3 hours. Thereafter, the thus obtained water soluble binder was divided for Examples 11–12 and Comparative Example 3. Then, the previously prepared $Ca_2P_2O_7$ dispersed solution having the 50% grain size distribution of 1.2 μm was added to Example 11 in an amount of 1.0 wt % to the fluorescent material, the solution having a 50% grain size distribution of 6.1 m was added to Example 12 in an amount of 1% and the solution having a 50% grain size distribution of 15.9 μm was added to Comparative Example 3 in an amount of 1 wt %, respectively and they were stirred for 10 hours to prepare three types of fluorescent material coating compositions.

Next, the thus obtained respective fluorescent material coating compositions were coated to the inner surfaces of glass bulbs and dried and baked by the same processes as those of Example 1 as well as 30 W circular fluorescent lamps (Model; FCL30EX-N/28) relating to Examples 11–12 and Comparative Example 3 each having the same dimension as those of Example 1 were made through the usual lamp manufacturing processes and a fluorescent material film adhering strength and lamp characteristics of the fluorescent lamps were measured likewise Example 1. Table 2 shows a result of measurements. Note, Table 2 also shows characteristics of the conventional fluorescent lamp as Comparative Example 2 using an organic binder.

TABLE 2

| SPECIMEN No. | BINDER | 50% GRAIN SIZE DISTRIBUTION OF $Ca_2P_2O_7$ ($\mu$m) | EXFOLIATED AREA OF FLUORESCENT MATERIAL FILM ($mm^2$) | INITIAL TOTAL BEAM OF LIGHT (lm) | AFTER 2000 HOURS OF LIGHTING | |
|---|---|---|---|---|---|---|
| | | | | | BEAM OF LIGHT MAINTAINING RATIO (%) | BLACKING INDEX |
| EXAMPLE 11 | WATER SOLUBLE | 1.2 | 0.0 | 2219 | 94.7 | 9.0 |
| EXAMPLE 12 | WATER SOLUBLE | 6.1 | 2.0 | 2183 | 93.4 | 8.5 |
| COMPARATIVE EXAMPLE 3 | WATER SOLUBLE | 15.9 | 7.1 | 2158 | 92.2 | 8.5 |
| COMPARATIVE EXAMPLE 2 | ORGANIC BINDER | — | 12.6 | 2180 | 91.2 | 8.0 |

As apparent from the result shown in Table 2, the fluorescent lamps using fine $Ca_2P_2O_7$ having the 50% grain size distribution of 1.2 $\mu$m had a very densely and closely formed fluorescent material film and no exfoliation and falling away of the fluorescent material film were observed at all. Further, the above fluorescent lamps had an initial total beam of light improved about 2.0% and further a 2000 hours beam of light maintaining ratio improved as much as 3.5% as compared with those of the conventional fluorescent lamps (Comparative Example 2) using the organic solvent.

On the other hand, although Example 12 whose 50% grain size distribution was 6.1 $\mu$m had excellent lamp characteristics, the adhering force of the fluorescent material film had a tendency to lower slightly. Further, although Comparative Example 3 having the excessively large 50% grain size distribution of 15.9 $\mu$m had an excellent adhering force as compared with that of Comparative Example 2 using the conventional organic binder, the quality of the fluorescent material film of Comparative Example 3 was greatly lowered, thus it was found that the fine particles of the added $Ca_2P_2O_7$ did not effectively act on the adhering force of the fluorescent material film.

Further, fluorescent lamps having a higher adhering force of the fluorescent material film and improved lamp characteristics as compared with those of conventional fluorescent lamps could be obtained by using pyrophosphate such as $Ca_2P_2O_7$ or the like having a 50% grain size distribution of 10 $\mu$m or less and preferably 5 $\mu$m or less.

Next, examples using various types of nitrate are used as the coupling agent will be described below.

EXAMPLES 13–15

Fluorescent material coating compositions were prepared under the same conditions as those of Examples 1–3 except that they contained 0.5 wt % $Gd(NO_3)_3$ as nitrate in place of $Ca(NO_3)_2$ used in Examples 1–3 as alkaline earth metal salt. Further, fluorescent lamps of Model FCL30W having the same dimension relating to Examples 13–15 were made through the usual lamp manufacturing processes in which the compositions were coated onto the inner surfaces of glass bulbs and dried and baked.

EXAMPLES 16–18

Fluorescent material coating compositions were prepared under the same conditions as those of Examples 4–6 except that they contained 0.5 wt % $La(NO_3)_2$ as nitrate in place of $Ca(NO_3)_2$ used in Examples 4–6 as alkaline earth metal salt, respectively and the contents of boric acid were changed to 0.005 wt %, 2.0 wt % and 4.0 wt %, respectively. Further, fluorescent lamps of Model FCL30W having the same dimension relating to Examples 16–18 were made through the usual lamp manufacturing processes in which the compositions were coated onto the inner surfaces of glass bulbs and dried and baked.

EXAMPLES 19–21

Fluorescent material coating compositions were prepared under the same conditions as those of Examples 7–9 except that they contained each 0.5 wt % of $Al(NO_3)_3$, $Y(NO_3)_3$ and $Ce(NO_3)_3$ as nitrate in place of $Ba(NO_3)_2$, $Sr(NO_3)_2$ and $Mg(NO_3)_2$ used, respectively in Examples 7–9 as alkaline earth metal salt, respectively. Further, fluorescent lamps Model of FCL30W having the same dimension relating to Examples 19–21 were made through the usual lamp manufacturing processes in which the compositions were coated onto the inner surfaces of glass bulbs and dried and baked.

Comparative Example 4

On the other hand, there was prepared a fluorescent material coating composition similar to that of Example 13 except that no $Ca_2P_2O_7$ as pyrophosphoric acid was added and 30 W circular fluorescent lamps relating to Comparative Example 4 were made by coating the composition onto the inner surfaces of glass bulbs and drying and baking it.

Comparative Example 5

30 W circular fluorescent lamps relating to Comparative Example 5 having the same dimension as those of the above examples were made by using a conventional organic binder composed of xylene as organic solvent containing ethyl cellulose dissolved therein as well as using a fluorescent material coating composition added with a borate compound as a coupling agent.

A fluorescent material film adhering strength, an initial total beam of light, a beam of light maintaining ratio after 2000 hours of lighting and a resistance to blacking of the fluorescent lamps of Examples 13–21 and Comparative Examples 4–5 made as described above were measured for evaluating characteristics thereof likewise Examples 1–10 and results shown in Table 3 were obtained.

TABLE 3

| SPECIMEN No. | BINDER | PYROPHOSPHATE TYPE | CONTENT (%) | BORIC ACID COMPOUND TYPE | CONTENT (%) | NITRATE TYPE | CONTENT (%) |
|---|---|---|---|---|---|---|---|
| EXAMPLE 13 | WATER SOLUBLE | $Ca_2P_2O_7$ | 1.0 | $B_2O_3$ | 0.2 | $Gd(NO_3)_3$ | 0.5 |
| EXAMPLE 14 | WATER SOLUBLE | $Ca_2P_2O_7$ | 2.0 | $B_2O_3$ | 0.2 | $Gd(NO_3)_3$ | 0.5 |
| EXAMPLE 15 | WATER SOLUBLE | $Ca_2P_2O_7$ | 3.0 | $B_2O_3$ | 0.2 | $Gd(NO_3)_3$ | 0.5 |
| EXAMPLE 16 | WATER SOLUBLE | $Sr_2P_2O_7$ | 0.5 | $H_3BO_3$ | 0.005 | $La(NO_3)_3$ | 0.5 |
| EXAMPLE 17 | WATER SOLUBLE | $Sr_2P_2O_7$ | 0.5 | $H_3BO_3$ | 2.0 | $La(NO_3)_3$ | 0.5 |
| EXAMPLE 18 | WATER SOLUBLE | $Sr_2P_2O_7$ | 0.5 | $H_3BO_3$ | 4.0 | $La(NO_3)_3$ | 0.5 |
| EXAMPLE 19 | WATER SOLUBLE | $Ca_2P_2O_7$ | 1.0 | $B_2O_3$ | 0.2 | $Al(NO_3)_3$ | 0.5 |
| EXAMPLE 20 | WATER SOLUBLE | $Ca_2P_2O_7$ | 1.0 | $B_2O_3$ | 0.2 | $Y(NO_3)_3$ | 0.5 |
| EXAMPLE 21 | WATER SOLUBLE | $Ca_2P_2O_7$ | 1.0 | $B_2O_3$ | 0.2 | $Ce(NO_3)_3$ | 0.5 |
| COMPARATIVE EXAMPLE 4 | WATER SOLUBLE | — | — | $B_2O_3$ | 0.2 | $Gd(NO_3)_3$ | 0.5 |
| COMPARATIVE EXAMPLE 5 | ORGANIC | XYLENE + ETHYL CELLULOSE + BORIC ACID COMPOUND | | | | | |

| SPECIMEN No. | EXFOLIATED AREA OF FLUORESCENT MATERIAL FILM ($mm^2$) | INITIAL TOTAL BEAM OF LIGHT (lm) | AFTER 2000 HOURS OF LIGHTING BEAM OF LIGHT MAINTAINING RATIO (%) | BLACKING INDEX |
|---|---|---|---|---|
| EXAMPLE 13 | 0.8 | 2199 | 93.5 | 8.5 |
| EXAMPLE 14 | 0.0 | 2210 | 94.3 | 9.0 |
| EXAMPLE 15 | 0.0 | 2191 | 93.6 | 9.0 |
| EXAMPLE 16 | 12.6 | 2194 | 93.3 | 9.0 |
| EXAMPLE 17 | 0.0 | 2178 | 92.7 | 8.5 |
| EXAMPLE 18 | 0.0 | 2107 | 89.5 | 6.5 |
| EXAMPLE 19 | 0.0 | 2210 | 93.8 | 9.0 |
| EXAMPLE 20 | 0.0 | 2216 | 93.4 | 9.0 |
| EXAMPLE 21 | 0.0 | 2209 | 94.0 | 8.5 |
| COMPARATIVE EXAMPLE 4 | 9.1 | 2202 | 93.8 | 8.5 |
| COMPARATIVE EXAMPLE 5 | 19.6 | 2172 | 91.0 | 8.0 |

As apparent from the results shown in Table 3, the fluorescent lamps of the respective examples made using the water soluble fluorescent material coating compositions each containing a predetermined amount of pyrophosphate, boric acid compound and alkaline earth metal salt had a very small amount the fluorescent material film exfoliated and could obtain an excellent adhering strength as compared with that of Comparative Example 5 using the conventional organic binder. Further, the examples could obtain an excellent result in lamp characteristics such as the initial total beam of light, the beam of light maintaining ratio after 2000 hours of lighting, the resistance to blacking and the like as compared with conventional products.

Examples 16–18 show fluorescent lamps using a fluorescent material containing 0.5 wt % fine pyrophosphoric acid strontium subjected to the beads milling and boric acid whose content was increased from 0.005 wt % to 4.0 wt %. In this case, even if the grain size of $Sr_2P_2O_7$ was distributed well, the fluorescent material film was greatly exfoliated when the content of $H_3BO_3$ was 0.005 wt % or less and a problem that an adhering strength was lowered was caused.

On the other hand, when the additive amount of $H_3BO_3$ was increased to 4.0 wt %, although an excellent adhering strength was obtained, there was a tendency that and a beam of light maintaining ratio after 2000 hours of lighting and a blacking state had a tendency of deterioration. It was confirmed that this tendency was not limited to the case that pyrophosphate was composed of $Sr_2P_2O_7$ but the lamp characteristics also exhibited the same tendency when $Ba_2P_2O_7$, $Al_4(P_2O_7)_3$, $Ca_2P_2O_7$, $Mg_2P_2O_7$, $Sn_2P_2O_7$, and $Zn_2P_2O_7$ were used individually or as compounds made by combining them.

Further, the fluorescent lamps relating to Examples 19–21 had an initial total beam of light improved 2% and a 2000 hours beam of light maintaining ratio improved 2–3% as compared with those of the conventional fluorescent lamps (Comparative Example 5) formed using the organic binder, thus they obtained excellent lamp characteristics.

EXAMPLES 22–23

Comparative Examples 6–7

Next, how the adhering strength of fluorescent material films and lamp characteristics are affected by the value of a 50% grain size distribution of pyrophosphate will be described based on Examples 22–23 and Comparative Examples 6–7.

There were prepared four types of $Ca_2P_2O_7$ dispersed solutions having a 50% grain size distribution of 1.2 μm (for Example 22), 6.1 μm (for Example 23), 15.9 μm (for Comparative Example 6) and 30.0 μm (for Comparative Example 7), respectively.

On the other hand, a three-wavelength daylight color fluorescent material of 200 g was gradually added into the water soluble binder prepared in Example 1 while it was being stirred and after it was stirred for 2 hours, a surfactant was added. Further, the water soluble binder was added with 1 g $Gd(NO)_3$ and stirred for 2 hours and then further added with 0.4 g $B_2O_3$ and stirred for 3 hours. Thereafter, the thus obtained water soluble binder was divided for Examples 22–23 and Comparative Example 6–7.

Then, the previously prepared $Ca_2P_2O_7$ dispersed solution having a 50% grain size distribution of 1.2 μm was added to Example 22 in an amount of 1.0 wt % to the fluorescent material, the solution having a 50% grain size distribution of 6.1 μm was added to Example 23 in an amount of 1.0 wt %, the solution having a 50% grain size distribution of 15.9 μm was added to Comparative Example 6 in an amount of 1.0 wt % and the solution having a 50% grain size distribution of 30.0 μm was added to Comparative Example 7 in an amount of 1.0 wt %, respectively and they were stirred for 10 hours to prepare four types of fluorescent material coating compositions.

Next, the thus obtained respective fluorescent material coating compositions were coated onto the inner surfaces of glass bulbs and dried and baked by the same processes as those of Example 1 as well as 30 W circular fluorescent lamps (Model; FCL30EX-N/28) relating to Examples 22–23 and Comparative Examples 6–7 each having the same dimension as those of Example 1 were made through the usual lamp manufacturing processes and a fluorescent material film adhering strength and lamp characteristics of the fluorescent lamps were measured likewise Example 1. Table 4 shows a result of the measurements.

pressure mercury vapor electric discharge lamp was made equal to or less than the average grain size of the fluorescent material. Consequently, there can be obtained the discharge lamp having the high adhering force (coupling force) of the fluorescent material film and excellent in lamp characteristics such as the total beam of light, the beam of light maintaining ratio and the like.

Since organic solvent such as butyl acetate, xylene and the like is not used but the water soluble fluorescent coating composition is used, the electric discharge lamp of high quality can be safely made without causing the problem of the adverse effect on a human body, air pollution, safety in job and the like.

Further, since the fluorescent material film has the large adhering strength, no fluorescent material film is exfoliated or fallen away in the processes for processing the circular type electric discharge lamp and the high load type electric discharge lamp including the process for bending a glass tube, thus the electric discharge lamp of high quality can be obtained.

TABLE 4

| SPECIMEN No. | BINDER | 50% GRAIN SIZE DISTRIBUTION OF $Ca_2P_2O_7$ (μm) | EXFOLIATED AREA OF FLUORESCENT MATERIAL FILM ($mm^2$) | INITIAL TOTAL BEAM OF LIGHT (lm) | AFTER 2000 HOURS OF LIGHTING BEAM OF LIGHT MAINTAINING RATIO (%) | BLACKING INDEX |
|---|---|---|---|---|---|---|
| EXAMPLE 22 | WATER SOLUBLE | 1.2 | 0.0 | 2211 | 94.0 | 9.0 |
| EXAMPLE 23 | WATER SOLUBLE | 6.1 | 0.8 | 2202 | 93.7 | 8.5 |
| COMPARATIVE EXAMPLE 6 | WATER SOLUBLE | 15.9 | 12.6 | 2166 | 92.7 | 8.5 |
| COMPARATIVE EXAMPLE 7 | WATER SOLUBLE | 30.0 | 20.4 | 2143 | 92.5 | 9.0 |

As apparent from the result shown in Table 4, the fluorescent lamps of Example 22 using fine $Ca_2P_2O_7$ having the 50% grain size distribution of 1.2 μm had a very densely and closely formed fluorescent material film and no exfoliation and falling away of the fluorescent material film were observed at all.

On the other hand, although Example 23 whose 50% grain size distribution was 6.1 μm had excellent lamp characteristics, the adhering force of the fluorescent material film thereof had a tendency to lower slightly. Further, the quality of the fluorescent material film of Comparative Examples 6–7 having the excessively large 50% grain size distribution of 15.9 μm and 30.0 μm was greatly lowered, thus it was found that the fine particles of the added $Ca_2P_2O_7$ did not effectively act on the adhering force of the fluorescent material film. The same effect was also confirmed as to the case in which other type of pyrophosphate was used.

As described above, fluorescent lamps having a higher adhering force of the fluorescent material film and improved lamp characteristics as compared with those of conventional fluorescent lamps could be obtained by using pyrophosphate such as $Ca_2P_2O_7$ and the like having a 50% grain size distribution of 10 μm or less and preferably 5 μm or less.

Industrial Applicability

As described above, according to the method of manufacturing the low pressure mercury vapor electric discharge lamp of the present invention, the electric discharge lamp is made by forming a fluorescent material film by coating and heating the fluorescent material coating composition (slurry) to a glass bulb which contains pyrophosphate having a 50% grain size distribution of 10.0 μm or less, a water soluble binder, at least one of alkaline earth metal salt and nitrate, and a boric acid compound, or the average grain size of pyrophosphate contained in the fluorescent material film formed to the inner surface of the glass bulb of the low

What is claimed is:

1. A low pressure mercury vapor electric discharge lamp having a fluorescent material film formed to the inner surface of a glass bulb, wherein said fluorescent material film contains a fluorescent material, pyrophosphate having an average grain size of 3.0 μm or less, at least one of alkaline earth metal salt and nitrate, and a boric acid compound.

2. A low pressure mercury vapor electric discharge lamp according to claim 1, wherein said pyrophosphate has an average grain size of 1.0 μm or less.

3. A low pressure mercury vapor electric discharge lamp according to claim 1, wherein said pyrophosphate is at least one selected from $Ba_2P_2O_7$, $Al_4(P_2O_7)_3$, $Sr_2P_2O_7 Ca_2P_2O_7 Mg_2P_2O_7 Sn_2P_2O_7$, and $Zn_2P_2O_7$.

4. A low pressure mercury vapor electric discharge lamp according to claim 1, wherein said glass bulb is formed to a circular shape or a high load shape.

5. A low pressure mercury vapor electric discharge lamp having a fluorescent material film formed to the inner surface of a glass bulb, wherein said fluorescent material film contains a fluorescent material, pyrophosphate having an average grain size one half or less that of said fluorescent material, at least one of alkaline earth metal salt and nitrate, and a boric acid compound.

6. A low pressure mercury vapor electric discharge lamp according to claim 5, wherein said pyrophosphate has an average grain size one fifth or less that of said fluorescent material.

7. A low pressure mercury vapor electric discharge lamp according to claim 5, wherein said pyrophosphate is at least one selected from $Ba_2P_2O_7$, $Al_4(P_2O_7)_3$, $Sr_2P_2O_7$, $Ca_2P_2O_7$, $Mg_2P_2O_7$, $Sn_2P_2O_7$, and $Zn_2P_2O_7$.

8. A low pressure mercury vapor electric discharge lamp according to claim 5, wherein said glass bulb is formed to a circular shape or a high load shape.

9. A method of manufacturing a low pressure mercury vapor electric discharge lamp, comprising the step of forming a fluorescent material film by coating a fluorescent material coating composition to the inner surface of a glass tube and heating said fluorescent material coating composition which contains a fluorescent material, a water soluble binder, pyrophosphate having a 50% grain size distribution of 10.0 µm or less, at least one of alkaline earth metal salt and nitrate, and a boric acid compound.

10. A method of manufacturing a low pressure mercury vapor electric discharge lamp according to claim 9, wherein the particles of said pyrophosphate have a 50% grain size distribution of 5.0 m or less.

11. A method of manufacturing a low pressure mercury vapor electric discharge lamp according to claim 9, wherein said pyrophosphate whose 50% grain size distribution is 10.0 µm or less is prepared by beads milling using non-alkaline glass beads.

12. A method of manufacturing a low pressure mercury vapor electric discharge lamp, comprising the step of forming a fluorescent material film by coating a fluorescent material coating composition to the inner surface of a glass tube and heating said fluorescent material coating composition which contains a fluorescent material, a water soluble binder, pyrophosphate having an average grain size equal to or less than that of said fluorescent material, at least one of alkaline earth metal salt and nitrate, and a boric acid compound.

13. A method of manufacturing a low pressure mercury vapor electric discharge lamp according to claim 12, wherein said pyrophosphate has an average grain size one second or less than that of said fluorescent material.

14. A method of manufacturing a low pressure mercury vapor electric discharge lamp according to claim 12, said pyrophosphate having an average grain size equal to or less than that of said fluorescent material is prepared by beads milling using non-alkaline glass beads.

* * * * *

UNITED STATES PATENT AND TRADEMARK OFFICE
CERTIFICATE OF CORRECTION

PATENT NO.: 5,905,333

DATED: May 18, 1999

INVENTORS: Chiharu TOMURA LEE et al.

It is certified that errors appear in the above-identified patent and that said Letters Patent is hereby corrected as shown below:

In claim 3, col. 16, line 46, "$Sr_2P_2O_7Ca_2P_2O_7Mg_2P_2O_7Sn_2P_2O_7,$"
should read --$Sr_2P_2O_7, Ca_2P_2O_7, Mg_2P_2O_7, Sn_2P_2O_7,$--.
In claim 10, col. 17, line 10, "5.0 m"
should read --5.0 µm--.

Signed and Sealed this

Twenty-fifth Day of January, 2000

Attest:

Attesting Officer

Acting Commissioner of Patents and Trademarks